United States Patent [19]

Clark

[11] Patent Number: 5,158,039

[45] Date of Patent: Oct. 27, 1992

[54] ELECTRICALLY CHARGEABLE GARMENT

[76] Inventor: Brian L. Clark, Rte. 1, Box 121, Kirkwood, Ill. 61447

[21] Appl. No.: 853,549

[22] Filed: Mar. 18, 1992

[51] Int. Cl.5 .................. A01K 29/00; A41D 17/00; B68B 11/00; F41B 15/04
[52] U.S. Cl. .......................... 119/29; 231/7; 361/232; 36/2 R
[58] Field of Search .............. 119/29, 174; 231/7; 273/84 ES; 361/232; D30/145; 36/2 R

[56]  References Cited
U.S. PATENT DOCUMENTS

| | | | |
|---|---|---|---|
| 1,915,721 | 6/1933 | Diaz | 361/232 |
| 2,155,331 | 4/1939 | Sadloski | 405/186 |
| 3,164,772 | 1/1965 | Hicks, IV | 361/232 |
| 3,211,153 | 10/1965 | Gambetti | 361/232 |
| 4,128,200 | 12/1978 | Jones et al. | 231/7 |
| 4,337,496 | 6/1982 | Laird | 231/7 |
| 4,370,696 | 1/1983 | Darrell | 231/7 |
| 4,485,426 | 11/1984 | Kerls | 361/232 |
| 4,805,558 | 2/1989 | Lehmann | 119/29 |
| 4,997,127 | 3/1991 | McEwen | 231/7 |

Primary Examiner—John G. Weiss
Attorney, Agent, or Firm—Moore & Hansen

[57]  ABSTRACT

The present invention provides an electrically chargeable garment having a pair of leggings having an outer layer with a pair of closely spaced electrical terminals of opposite polarity disposed on the outer surface of the outer layer. There is also provided means for attaching the leggings to a wearer and means for adjustably supporting the leggings from the wearer.

28 Claims, 3 Drawing Sheets

ELECTRICALLY CHARGEABLE GARMENT

The present invention relates particularly to electric chaps for shocking an animal, such as a pig, when the animal contacts them and generally to protective clothing for a farmer, rancher or other animal handler.

BACKGROUND OF THE PRESENT INVENTION

Livestock-caused injuries to farmers and animal handlers are a serious concern for those who work with larger animals. Livestock can pin a farmer against the side of a building or other unyielding structure, resulting in broken bones and other serious injuries. Livestock can easily injure a person by knocking him to the ground. Large farm animals have caused serious foot injuries by simply stepping on the farmer's feet. The sturdy caps of steel-toed shoes have been known to buckle when stepped upon by farm animals, and badly crushed toes have at times required amputation. In addition, some animals will nip or bite people working amongst them. Deaths, while infrequent, have also been attributed to encounters with livestock.

The threat of a debilitating injury is a real one that increases with the size of the animal involved in the injury-causing incident. Hogs normally will reach a weight of about two hundred pounds or more in about six months, and mature animals can weigh between six hundred and a thousand pounds or more. Similarly, cattle raised for slaughter will reach a thousand pounds when sent to market and can reach weights considerably in excess of this if allowed to continue to grow. Animals of such size possess great physical strength and can easily cause injuries to people.

Most livestock-caused injuries have occurred as a result of innocent encounters between the farmer and his livestock where there is no hostile attack by the animal. Modern farming techniques, however, have increased the likelihood of a hostile encounter with a farm animal generally and with an aggressive or angry one in particular. More and more animals are being raised in confinement situations where a large number of animals are held in a small area. Animals tend to become more aggressive as they become more confined. With modern farming techniques of animal confinement, then, increasingly aggressive tendencies in animals have been seen. This leads to a greater chance of an injury to a farmer or other person moving amongst the animals because the injury-causing encounter is less likely to be an innocent one but rather one of aggression where the animal intends at least to physically contact the farmer if not to cause an injury.

The farmer or other person working around animals often experiences a greater risk at feeding time due to an animal's often agitated or aggressive states. For example, a farmer feeding hogs will often have his hands occupied by carrying pails of feed and will be unable to ward the hogs away. The hungry and eager hogs become excited and move towards the farmer, pushing and shoving each other to be first at the feed. Often they will push each other into the farmer, jostling him from one or more sides, stepping on his feet, constantly unbalancing him. Additionally, since the hogs are quite often dirty from rooting or wallowing, brushing against the farmer will frequently leave him wet and dirty. When this happens at the beginning of the day the farmer is forced to choose between changing clothes or living with damp and dirty clothing for the rest of the day. Both alternatives are a nuisance and the former can break up and introduce delays in an already busy day.

Electrical devices have been used by farmers to herd and control livestock. Thus, it is known to provide high voltage livestock prods that have a pair of closely spaced open electrical terminals of opposite polarity disposed at the end of a shaft. When the terminals are brought into contact with an animal's body the animal receives an electrical shock.

While prods are useful, the farmer must have the prod in his hand in order to use it. If the farmer needs both hands free for work, he must holster the prod. At present, there are no devices available that a farmer can utilize in warding such animals away when working amongst them that would leave the farmer's hands free for work.

It would be desirable to have a device that a farmer, veterinarian, or other animal handler working amongst livestock could use to ward off the approach and dangerous contact of the animals without causing permanent injury to the livestock and which would allow the person free use of his hands to accomplish his work. The present invention has accomplished this goal.

SUMMARY OF THE PRESENT INVENTION

The present invention provides an electrified garment including a pair of electrified leggings or chaps for a farmer or other user that have closely spaced electrical contacts or terminals of opposite polarity, so that when the terminals are contacted by an animal, the invention will operate to provide an electrical shock of sufficient voltage that the animal will be repulsed and in at least some instances its subsequent behavior modified. Each legging includes a first layer formed of a substantially non-conducting material and has at least one pair of electrical terminals of opposite polarity disposed on the outward facing surface of those leggings. In one embodiment described herein, each legging includes an inner layer made of a substantially moisture impermeable material and an outer layer made of a substantially electrically nonconductive material. The inner and outer layers are attached to each other. An array of electrical conductors of opposite polarity are closely disposed to each other on the outer surface of the outer layer. In one embodiment the conductor array may comprise a pair of wires attached by known means such as stitching to the outwardly facing surface of the outer layer in a prearranged pattern. In another embodiment, the conductor array may comprise a conductive foil adhered to a rubber or synthetic material substrate.

The present invention further includes a power source for applying a high voltage between the terminals and means for attaching the leggings to the farmer or other wearer. The means for attaching the present invention to a farmer may include a waist belt and may further include means for adjustably supporting the leggings, such as adjustable suspenders, from the waist belt so that the electrical contacts are below the normal reach of the farmer's hands to prevent him from being accidentally shocked.

Another feature of the present invention is that, if desired, a signal perceptible to the animals, such as an audible sound, may be generated during activation to provide a further behavior modifying stimulus to the animals.

These and other advantages of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PRESENT INVENTION

Figure 1:
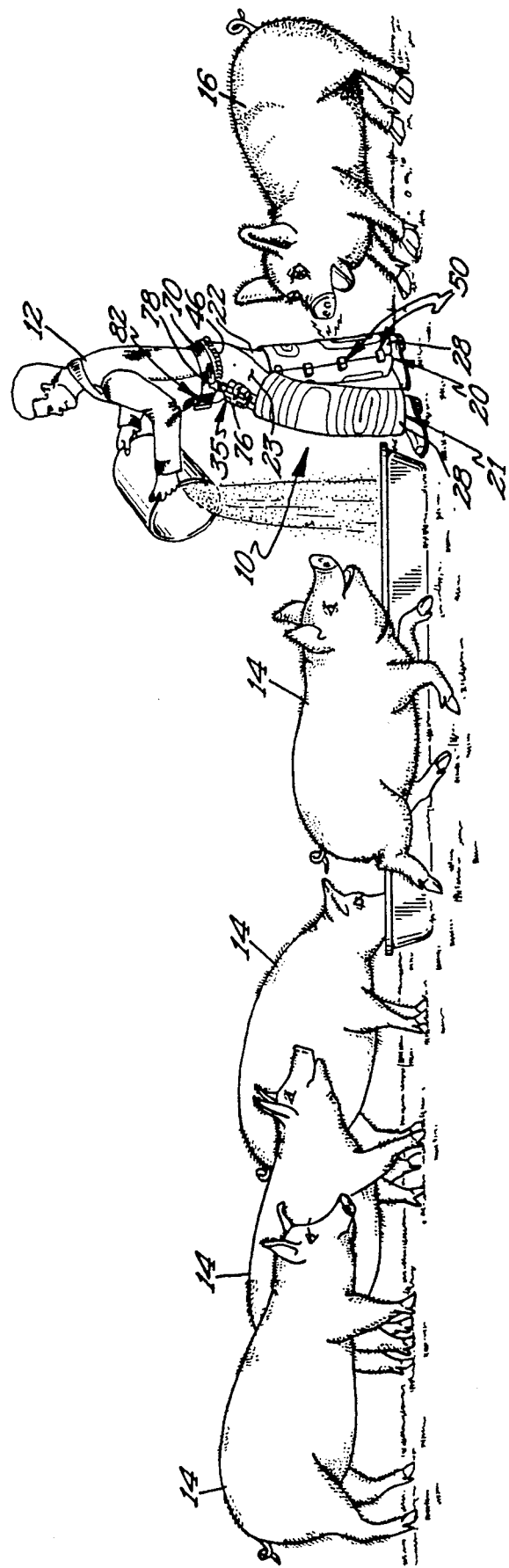
FIG. 1 shows an embodiment of the present invention being utilized in a livestock feeding situation.
Figure 2:
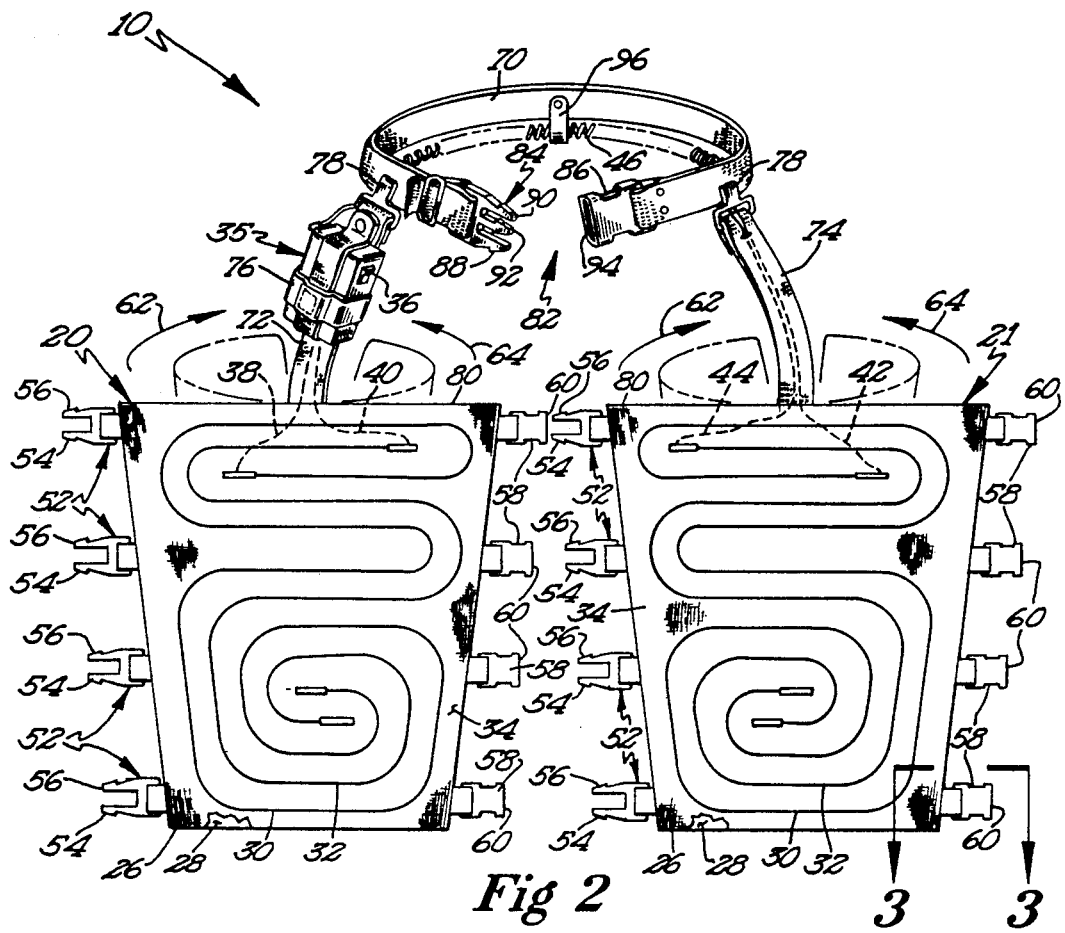
FIG. 2 is a front view of an embodiment of the invention showing the leggings unbuckled and laid out flat so as to present a plan view.
Figure 3:
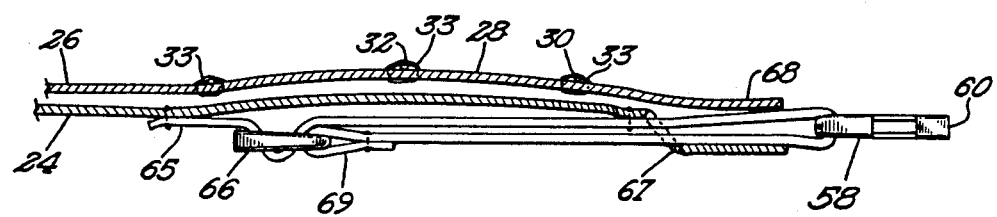
FIG. 3 is a cross-sectional view taken along cutting plane 3—3 of FIG. 2 and showing the dual layer structure of the leggings.

FIG. 1 illustrates an embodiment 10 of the electrified chaps invention being worn by a user 12, who is shown feeding a herd of hogs 14. The chaps 10 utilize a pair of leggings 20 and 21 adapted for wearing around the user's legs 22 and 23 respectively. Referring now to FIGS. 1-3, each legging 20 and 21 includes a first or outer flexible material layer 26 made of a substantially non-conductive material and a second or inner flexible fabric layer 24 made of a substantially moisture proof material. Inner layer 24 may be a vinyl or neoprene rubber material such as FRO-PRENE, a material manufactured by Frommelt Industries of Dubuque, Iowa. Outer layer 26 may also be manufactured of the same type of material. It is preferable, however, that inner layer 24 be moisture proof so that perspiration generated by the wearer of device 10 or other moisture such as rain, spills or the like, will not moisten the fabric so as to establish an electrical short circuit between inner and outer layers 24 and 26 of leggings 20 and 21 such that the wearer of the device 10 receives an electrical shock. Additionally, outer layer 26 is electrically non-conductive or insulative since if it were conductive, the outer layer would complete a circuit between the open electrical terminals to be described hereafter. Each legging could include a single layer of non-conductive moisture impermeable material rather than the double layer shown herein. Finally, it is preferred that device 10 in general and leggings 24 and 26 in particular be made of washable material so that they can be cleaned and disinfected before moving from one animal pen, yard, or confinement unit to another to avoid the spread of disease, particularly between farms.

Thus, as shown in the Figures, each legging includes an array of conductor means, such as a pair of wires 30 and 32, attached to the outer surface 28 of outer layer 26. Wires 30 and 32 may be attached to outer surface 28 by any known means including stitching 33, best seen in FIG. 3. Wires 30 and 32 are of opposite polarity such that when an animal contacts both wires, a circuit will be established from one of the wires through the skin of the animal to the other wire, thus causing the animal to receive an electrical shock from device 10. As shown, wires 30 and 32 are closely spaced relative to one another and are arranged in a twisting curvilinear, generally serpentine array across outer surface 28. Wires 30 and 32 may be arranged in various twisting patterns or arrays across the outer surface. It is important, however, to keep open electrical terminals 30 and 32 placed in close enough proximity to one another such that the circuit is easily completed when an animal engages outer surface 28. Such a circuit would extend from one conductor or wire through the animal and to the other conductor or wire.

An animal can also receive a shock by contacting a single conductor or wire. This circuit would run from the contacted wire and then through the animal and to the ground upon which the animal is standing. The magnitude of the shock received under such circumstances will be affected by ambient conditions such as humidity, the animal's skin moisture, and the moisture content of the ground on which the animal is standing. Under such conditions, the magnitude of the shock will in almost all cases be less than that received in the wire-animal-wire circuit. The dual conductor arrangement is therefore preferred over a single conductor arrangement.

Generally, then, leggings 20 and 21 include at least one pair of electrical terminals of opposite polarity. It is preferred that the inner leg portions 34 of the leggings be free of any electrical terminals so that shorting between leggings 20 and 21 is avoided. Rather than the array of electrical contacts presented by the single pair of elongate terminals as shown in the Figures, the leggings may include an array of individual pairs of electrical contacts facing at least forwardly and preferably laterally outwardly also. For example, wires 30 and 32 could be woven into the outer layer 26 so that only portions thereof were disposed upon the outer surface 28 of outer layer 26. Weaving the wires into and out of the outer layer of fabric creates an air flow path that will aid in preventing any moisture build-up between the layers that could lead to a short between the wires and the wearer's legs. Additionally, the array could be represented by multiple wire pairs rather than a single wire pair with the multiple pairs being connected either in series or in parallel to a power source 35.

Wires 30 and 32 are energized by power source 35, which supplies electrical current thereto. Power source 35 preferably includes a rechargeable type of battery and preferably is capable of producing an electrical discharge between wires 30 and 32 having a voltage in the range of about 3000 to 4000 volts. Such a device is manufactured by Hot Shot Products Co. of Savage, Minn. and is commercially available. Power source 35 may include an on/off switch 36 to preserve the rechargeable battery contained therein. Power source 35 is electrically connected to wires 30 and 32 of legging 20 by means of a pair of wires 38 and 40, respectively. Power source 35 is electrically connected to wires 30 and 32 of legging 21 by means of a second set of wires 42 and 44, respectively, which are connected to power source 35 via a coiled electrical cable 46.

Referring briefly to FIG. 1, each legging includes a plurality of coupling members 50. Coupling members 50 are commercially available, buckle-type couplings and as seen in FIG. 2, include forwardly projecting male coupling elements 52 in the form of spaced apart prongs 54 and 56. Prongs 54 and 56 are adapted to be releasably and attachably received in complimentary coupling members 58. Each member 58 is comprised of a buckle sleeve 60 which is adapted to receive prongs 54 and 56. Prongs 54 and 56 are spring members which may be squeezed inwardly towards each other for insertion within buckle sleeve 60. When thus inserted, prongs 54 and 56 spring outwardly to maintain a secure friction engagement of prongs 54 and 56 within buckle sleeve 60. Thus, each legging 20 and 21 may be wrapped around a wearer's legs as indicated by arrows 62 and 64 and male coupling element 52 may be received within complimentary coupling member 58 to securely wrap each legging around a wearer's leg.

As seen in FIG. 3, complimentary coupling members 58 are preferably adjustably attached to inner layer 24 to accommodate different leg sizes. Each member 58 is attached to a legging 20 or 21 by a single strap 65 that is attached at one end to inner layer 24, that is looped through an adjustment buckle 66 and that then passes through an opening 67 in inner layer 24 into the inner layer space 68 between layers 24 and 26. Strap 65 is looped through member 58 back on itself through opening 67 and buckle 66. Strap 65 may be attached directly to adjustment buckle 66 or again looped back on itself and sewn at 69 as shown.

Leggings 20 and 21 are adjustably supported from a waist belt 70 by a pair of straps 72 and 74 respectively. Strap 72 carries wires 38 and 40 from power pack 35 and supports power source 35 in a holster 76. Similarly, strap 74 carries wires 42 and 44. Straps 72 and 74 are adjustably attached to waist belt 70 by means of clips 78, which enable leggings 20 and 21 to be positioned as desired with respect to the legs of the wearer and belt 70. Preferably, the attachment between straps 72 and 74 and clip 78 is an adjustable one such that the top edge 80 of leggings 20 and 21 can be adjusted so as to maintain the top edge 80 at a height below where the wearer's hand would normally reach. This enables the wearer to avoid an unintentional shock. Waist belt 70 includes a coupling member 82 comprising a male coupling element 84 and a complimentary coupling member 86. Element 84 includes a pair of prongs 88 and 90 and an inner latch, guide prong 92. Complimentary coupling member 86 includes a buckle sleeve 94 which is adapted to receive prongs 88, 90 and 92 in a secure, releasable, and detachable engagement. Outer prongs 88 and 90 are preferably spring members that may be squeezed inwardly towards each other for insertion within buckle sleeve 94. Belt 70 is preferably adjustable in length to accommodate different waist sizes and further includes a strap member 96 by which cable 46 may be held closely adjacent thereto.

Referring again to FIG. 1, the operation of the present invention will be explained. The wearer 12 will first put on the garment 10 by attaching it around his waist, that is, by engaging coupling element 84 with complementary coupling member 86. Each legging 20 and 21 may then be adjustably attached to the wearer's legs. When wearer 12 is adjacent the animal's pen or in amongst them, the invention 10 may then be activated by turning it on using switch 35. Legging 20 will be charged by a flow of current from power source 36 into either wire 38 or 40 and from there into wire 30 or 32 respectively, depending upon which wire is connected directly to the power source 36 as the current feed to the legging 20. Similarly, legging 21 will be charged by the flow of current through cable 46 and into either wire 42 or 44 and from there into wires 30 or 32 attached to legging 21, again depending upon which wire is connected to power source 35 as the current source for the legging 21. As noted, a wearer 12 is shown feeding the hogs 14. Hog 16 is shown reacting to receiving a shock from device 10. Hog 16 has engaged the legging 20 or 21 such that by its contact with the legging, it has simultaneously contacted either wires 30 and 32 of legging 20 or of legging 21 By simultaneously contacting the wires, the animal has completed a circuit from wire 30 to wire 32 through its skin, thereby delivering an electrical shock to the hog 16. Because of the shock received from device 10, hog 16 will thereafter avoid making contact with or otherwise coming too close to person 12. Similarly, if any of the other hogs 14 should come in contact with device 10, they would receive a similar electrical shock and have their behavior appropriately modified so as to avoid contact with person 12 and, in general, to avoid even coming too close to person 12. Device 10 thus serves as an appropriate animal behavior modification device useful for teaching animals, such as hogs 14, to maintain a safe distance from an individual wearing such a device. Device 10 is preferably constructed such that when activated a perceptible signal such as an audible sound is emitted on a continuous or intermittent basis. The normal transformer hum associated with the power unit 35 can serve such a function. Such an audible tone will indicate to the animals that the device is active and provide warning to them to maintain a safe distance from the wearer.

Figure 4:
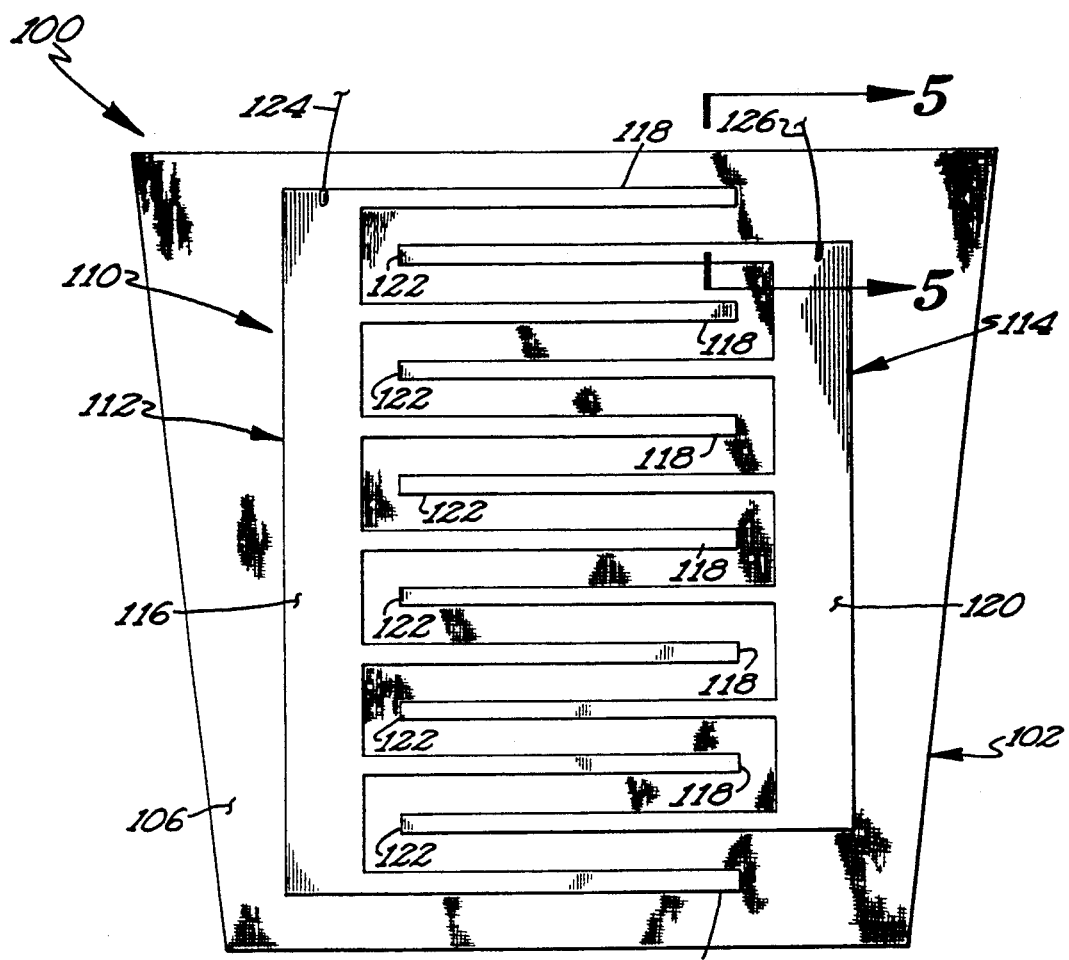
FIG. 4 illustrates an alternate embodiment of the present invention wherein the conductive means is formed by a conductive foil adhered to a non-conductive substrate that is heat-bonded to the garment.
Figure 5:
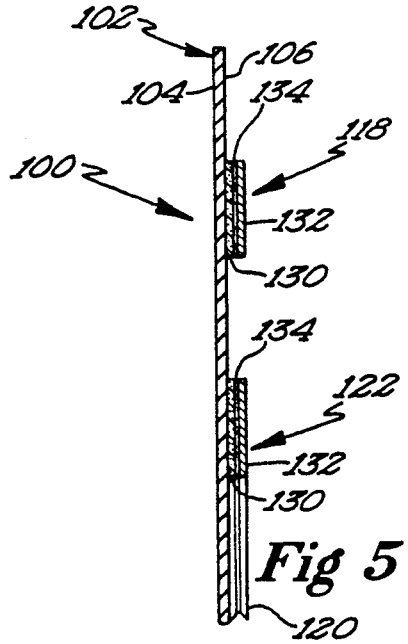
FIG. 5 is a side cross-sectional view of the embodiment shown in FIG. 4 taken along cutting plane 5—5.

FIGS. 4 and 5 show a single legging 100 which would generally be used with a second like legging and which embodies the present invention. Legging 100 comprises a leg-confronting layer 102 having inner and outer surfaces 104 and 106, respectively. A conductive array 110 is attached to outer surface 106 of leg-confronting layer 102. Conductive array 110 includes a first polarity subarray 112 and a second, opposite polarity, subarray 114. First polarity subarray 112 includes an elongate member 116 from which spaced apart, generally parallel, finger members 118 extend traversely. Similarly, second polarity subarray 114 includes an elongate member 120 from which spaced apart, generally parallel, finger members 122 extend traversely toward member 112. Finger members 118 and 122 are interdigitated to form an intermingling grid of closely spaced, generally parallel, oppositely charged, conductive terminals. As shown, the first and second polarity subarrays 112 and 114 are arranged such that their respective elongate members 116 and 120 are arranged substantially vertically, that is, parallel with the longitudinal axis of the wearer's leg, though they could also be arranged such that the individual finger members 118 and 120 are so arranged. First and second polarity subarrays 112 and 114 are connected to power source 35 by conductive wires 124 and 126, respectively.

Referring now to FIG. 5, finger members 118 and 122 will now be described. It will be understood that the description of one of the members is equally descriptive of the remainder, and furthermore, that finger members 122 and 118 are substantially similar such that the description of one will suffice for the other. Thus, referring to the embodiment of finger member 118 of subarray 112, members 118 (and also first polarity subarray 112) is formed of a substrate 130 to which a conductive foil 132 is bonded by an adhesive 134. Conductive foil 132 may generally be formed of any conductive material, though copper and aluminum are best known for such purpose and are preferred. Substrate 130 may be manufactured either of a rubber type of material, or a fiberglass product. Duracote Corporation manufactures a fabric under the tradename of Foylon which is of the type that may be readily attached to leg-confronting layer 102. In the embodiment shown in FIG. 5, substrate 130 is formed of a rubber based material as is leg-confronting layer 102. In such a circumstance, first and second polarity subarrays 112 and 114 may be heat bonded to the leg-confronting layer 102.

Figure 6:
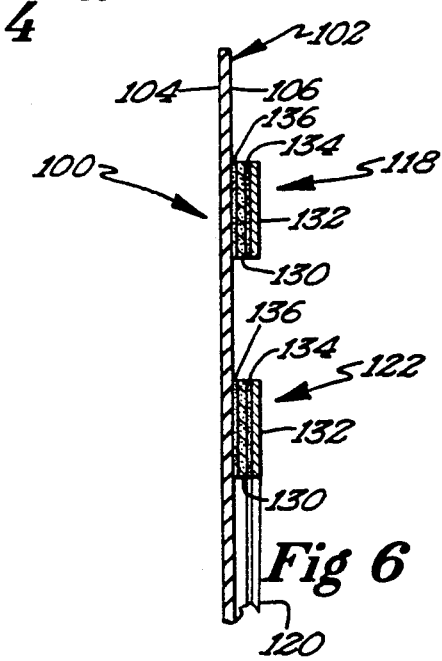
FIG. 6 is a cross-sectional view of an embodiment similar to that shown in FIG. 4, but wherein the non-conductive substrate is adhesively bonded to the garment.

FIG. 6 represents a substantially similar embodiment to that shown in FIG. 5 wherein the substrate layer 130 is bonded to the outer surface 106 of leg confronting layer 102 by an adhesive 136. In all other respects, the embodiments of FIGS. 5 and 6 are substantially identical.

It should be noted that the conductive arrays 112 and 114 could be stitched to layer 102 rather than adhesively attached thereto. Stitching, while within the scope of the invention, is not generally preferred because the threads can form a path for moisture to be wicked through layer 102 into contact with the wearer. In turn, the dampened stitching can then form a conductive pathway between the arrays 112 and 114 and the wearer and could therefore under certain conditions cause the wearer to receive a shock.

The present invention having thus been described, other modifications, alterations, or substitutions may now suggest themselves to those skilled in the art, all of which are within the spirit and scope of the present invention. By way of example only, complimentary coupling members 52 and 58 could be replaced by a zipper extending longitudinally up the leggings or by a hooks and loops attachment such as a Velcro ® type of closure. If desired, leggings 20 and 21 could be manufactured in a one-size legging fits all manner and thus the members 52 and 58 or similar adjustment means could be dispensed with. Additionally, the suitability of certain synthetics as conductors is currently being investigated. Thus, the conductive array of the present embodiment may in the future be formed from a fabric made of such materials, and such an alternative is within the purview of the invention. It is therefore intended that the present invention be limited only by the scope of the attached claims below.

I claim:

1. An electrically chargeable garment usable on a wearer's legs for repelling animals from the wearer, said device being energized by a power source and comprising:
   a pair of leggings to be worn on the wearer's legs, each said
      legging comprising:
         a first layer of substantially non-conductive material and having an outwardly facing surface; and
         at least one pair of electrical terminals of opposite polarity disposed on said outwardly facing surface, said electrical terminal being selectively connected to the power source; and
      means for attaching said leggings to a wearer.

2. The garment of claim 1 wherein said terminals comprise a pair of closely spaced wires.

3. The garment of claim 1 and further including a second layer of substantially moisture proof material positioned to confront the wearer's legs and attached to said first layer.

4. The garment of claim 1 wherein each said legging has inner and outer leg portions and wherein each said inner leg portion is characterized by a lack of said electrical terminals for substantially preventing electrical shorting between said leggings.

5. The garment of claim 4 wherein said terminals comprise:
   a pair of closely spaced wires.

6. The garment of claim 5 wherein said pair of wires is arranged on said outer layer in a serpentine pattern.

7. The garment of claim 1 wherein said means for attaching comprises:
   a waist belt to be worn about the wearer's waist; and
   means for adjustably supporting said leggings from said waist belt, said means for adjustably supporting enabling said leggings to be supported such that said electrical terminals are below the reach of the wearer's hand so as to enable the wearer to avoid being unintentionally shocked by said garment by contact between the wearer's hands and said terminals.

8. The garment of claim 7 wherein each said legging has inner and outer leg portions and wherein each said inner leg portion is characterized by a lack of said electrical terminals for substantially preventing electrical shorting between said leggings.

9. The garment of claim 8 wherein said power source produces a voltage differential in the range of about 3000 to 4000 volts between said wires of opposite polarity.

10. The garment of claim 7 wherein said power source produces a voltage differential in the range of about 3000 to 4000 volts between said wires of opposite polarity.

11. The garment of claim 1 wherein said power source produces a voltage differential in the range of about 3000 to 4000 volts between said wires of opposite polarity.

12. The garment of claim 11 wherein said power source includes a rechargeable battery.

13. The garment of claim 1 wherein at least one of said leggings further includes means for accommodating a range of leg sizes.

14. An electrically chargeable garment usable on a wearer's legs for repelling animals from the wearer by providing an electrical shock to the animals, said garment comprising:
   a pair of leggings to be worn on the wearer's legs, each said
      legging having an outer surface and including:
         a conductive array of electrical contacts of opposite electrical polarity, said conductive array being disposed on said outer surface of each said legging, facing at least forwardly; and
      a source of electrical power, said source being selectively electrically connected to said electrical contacts,
   wherein an animal will receive an electrical shock when it touches said electrical contacts.

15. The garment of claim 14 wherein said conductive array comprises a pair of closely spaced wires, said wires being of opposite electrical polarity.

16. The garment of claim 15 wherein said pair of wires is closely spaced and attached to said legging in a generally serpentine pattern.

17. The garment of claim 14 wherein said conductive array also faces laterally outwardly and away from the area between the wearer's legs.

18. The garment of claim 14 wherein said garment includes means for disposing said electrical power source at or about the wearer's waist level.

19. The garment of claim 14 wherein said conductive array comprises a plurality of separate pairs of electrical contacts of opposite polarity.

20. The garment of claim 14 wherein an audible sound is generated whenever said power source is in an on condition, said audible sound providing a warning to the animals such to avoid the wearer.

21. The garment of claim 14 wherein said conductive array follows a twisting path on said outer surface.

22. The garment of claim 14 wherein said conductive array comprises a fabric having a conductive outer surface layer.

23. The garment of claim 22 wherein said fabric includes a non-conductive substrate that is attached to said outer legging surface and an outwardly facing conductive layer that is attached to said non-conductive substrate.

24. The garment of claim 22 wherein said conductive array comprises a plurality of closely spaced, oppositely charged members.

25. The garment of claim 24 wherein each said member comprises a fabric including a non-conductive substrate that is attached to said outer legging surface and an outwardly facing conductive layer that is attached to said non-conductive substrate.

26. A method for training animals to clear the path of a person walking amongst a plurality of animals comprising:
    attaching an electrically chargeable garment to the person to suspend the garment about at least one leg;
    charging the garment with a voltage level adequate to shock the animal; and
    walking among the animals so as to bring the charged garment into electrical contact with an animal along the person's path.

27. The method of claim 26 and further including the step of activating a perceptible signal during charging of the garment, said signal generally remaining perceptible to the animal while the garment is charged, thereby warning the animal that the garment is charged so as to warn the animal that a distance should be maintained between the animal and the person so as to define a clear path.

28. The method of claim 26 wherein said garment is suspended from the lower half of the person's body so as to leave the person's hands free for other activities.

* * * * *